United States Patent
Testicioglu et al.

(10) Patent No.: US 9,813,352 B2
(45) Date of Patent: Nov. 7, 2017

(54) METHOD FOR PRIORITIZING NETWORK PACKETS AT HIGH BANDWIDTH SPEEDS

(71) Applicant: Citrix Systems, Inc., Fort Lauderdale, FL (US)

(72) Inventors: Mustafa Kutluk Testicioglu, Mountain View, CA (US); Seth K. Keith, Scotts Valley, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 543 days.

(21) Appl. No.: 13/975,161

(22) Filed: Aug. 23, 2013

(65) Prior Publication Data

US 2015/0055659 A1    Feb. 26, 2015

(51) Int. Cl.
*H04L 12/863* (2013.01)
*H04L 12/851* (2013.01)
*H04L 12/873* (2013.01)

(52) U.S. Cl.
CPC ...... *H04L 47/6225* (2013.01); *H04L 47/2441* (2013.01); *H04L 47/527* (2013.01); *H04L 47/6295* (2013.01)

(58) Field of Classification Search
USPC ........................................ 370/412
See application file for complete search history.

(56) References Cited

U.S. PATENT DOCUMENTS

2002/0136200 A1*  9/2002  St. John .................. 370/352
2007/0297348 A1* 12/2007  Trac et al. .............. 370/254

OTHER PUBLICATIONS

Bennett, J. et al., "Hierarchical Packet Fair Queueing Algorthims," ACM SIGCOMM Computer Communication Review, vol. 26, Issue 4, Oct. 1996, 14 pages.
Shreedhar, M., et al., "Efficient Fair Queuing Using Deficit Round Robin," ACM SIGCOMM Computer Communication Review, vol. 25, Issue 4, Oct. 1995, 27 pages.

* cited by examiner

*Primary Examiner* — Yaotang Wang

(57) ABSTRACT

The embodiments are directed to methods and appliances for scheduling a packet transmission. The methods and appliances can assign received data packets or a representation of data packets to one or more connection nodes of a classification tree having a link node and first and second intermediary nodes associated with the link node via one or more semi-sorted queues, wherein the one or more connection nodes correspond with the first intermediary node. The methods and appliances can process the one or more connection nodes using a credit-based round robin queue. The methods and appliances can authorize the sending of the received data packets based on the processing.

29 Claims, 9 Drawing Sheets

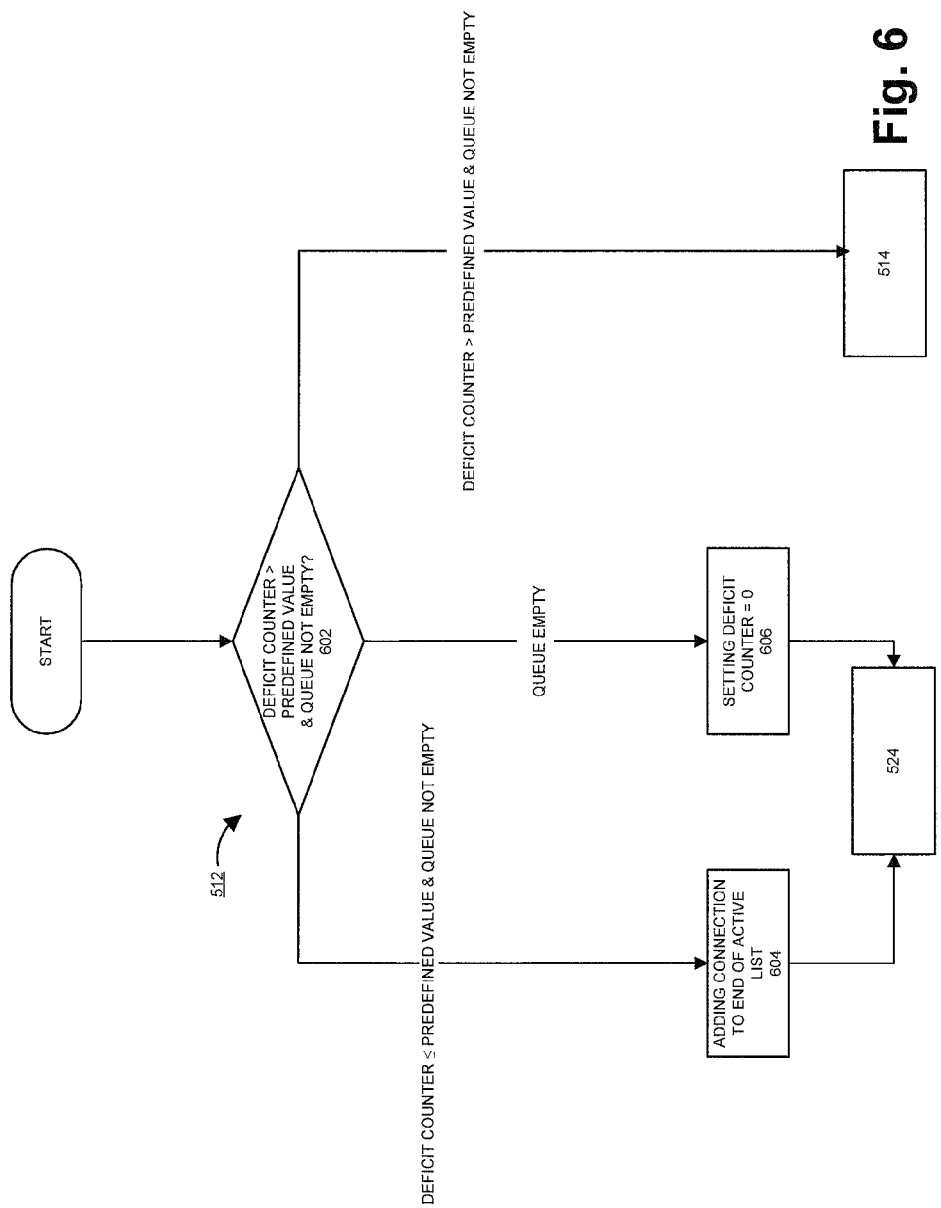

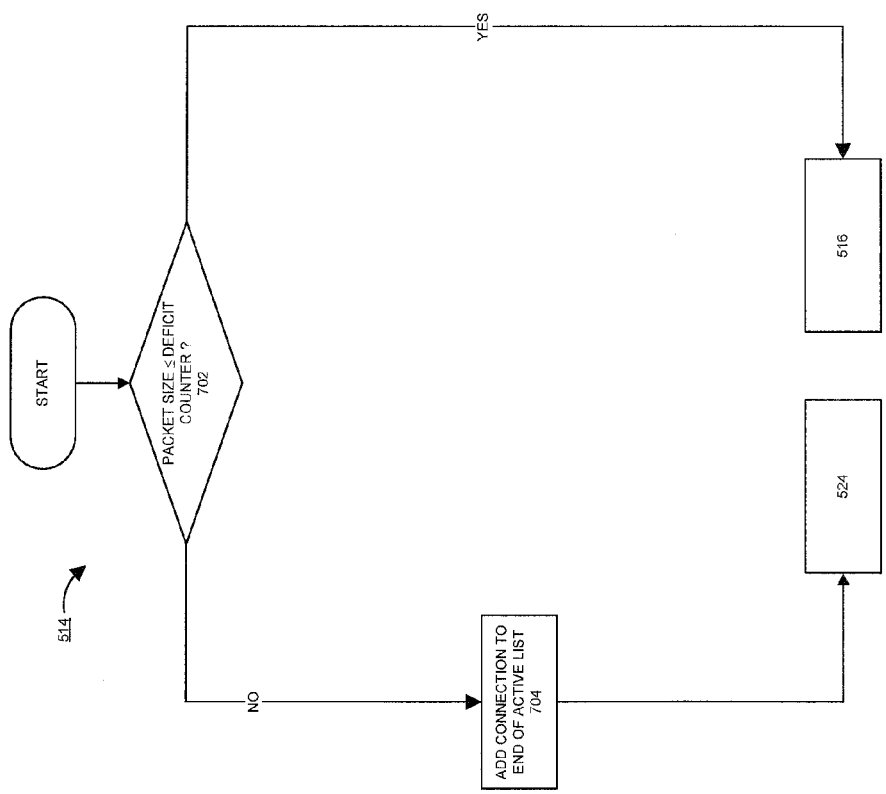

METHOD FOR PRIORITIZING NETWORK PACKETS AT HIGH BANDWIDTH SPEEDS

FIELD

Example embodiments relate to methods and systems for prioritizing network packets and scheduling network connections for transmission of prioritized network packets.

BACKGROUND

Large networks like the Internet, enterprise networks, metropolitan area networks, and cellular networks transport information using packets that are routed and switched through various segments of a network. Within these networks, users are provided with a plurality of user applications. User applications are becoming increasingly more complex, and the amount of data generated by these applications is increasing at an exponential rate. To accommodate user demand for data intensive applications, only two options exist. The first option entails increasing the capacity of existing networks, by adding more equipment to the infrastructure. This approach is not only expensive, but it also requires a significant amount of network downtime in order to properly install and troubleshoot the addition of new hardware and software to existing network infrastructure. The second option includes developing techniques to optimize the performance of the existing infrastructure.

Several traffic control techniques have been implemented to address this problem. The most rudimentary traffic control technique discards packets if the network is congested. More advanced techniques, including Transmission Control Protocol (TCP), and several variants of TCP use a sliding window that limits the total number of unacknowledged packets in transit from end-to-end. TCP, however, treats all network packets the same, which can result in an increase in the number of dropped packets as the number of connections increases. Each connection established between devices represents a connection established by an individual application. For example, a user might be downloading a software update for a word processor, using an email client, using a web browser, hosting a website, streaming multimedia (e.g. video or audio), using an instant messaging program, running a virtual desktop program, etc. In this scenario, it is possible that eight or more different connections are formed. In a virtual environment, however, a single machine can host applications for multiple users utilizing the same services. This results in a significant increase in the total volume of data, and the number of connections needed to support the required bandwidth of each application requesting access to the Internet. To ensure packets are not discarded, and each connection is given an equal opportunity to transmit the packets in their queue, techniques for scheduling a number of packets, and a number of connections used to transmit packets on a given connection must be developed.

A packet scheduler can be used to ensure that packets are not discarded and each connection is given an opportunity to transmit packets that are in their queues. The packet scheduler accomplishes this by prioritizing packets on each connection. For example, VoIP data or video data might not be as tolerable to latency as email and web data. As a result the packet scheduler can assign a higher priority to packets associated with VoIP or video data than packets associated with email or web data, to ensure that VoIP or video data packets are not dropped.

But in typical packet-scheduling systems, the prioritizing of packets is not an efficient process, especially when the prioritizing is across a large number of connections (e.g., in some cases, hundreds or thousands of connections). An alternative approach has been created that provides a more efficient prioritizing process for a packet scheduler organizing and managing a large number of connections.

BRIEF DESCRIPTION OF THE DRAWINGS

Reference will now be made to the accompanying drawings showing example embodiments of this disclosure. In the drawings:

FIGS. 5-7 are flowcharts representing an exemplary method of scheduling network connections for transmission of prioritized network packets, consistent with embodiments of the present disclosure.

DETAILED DESCRIPTION

Figure 1:
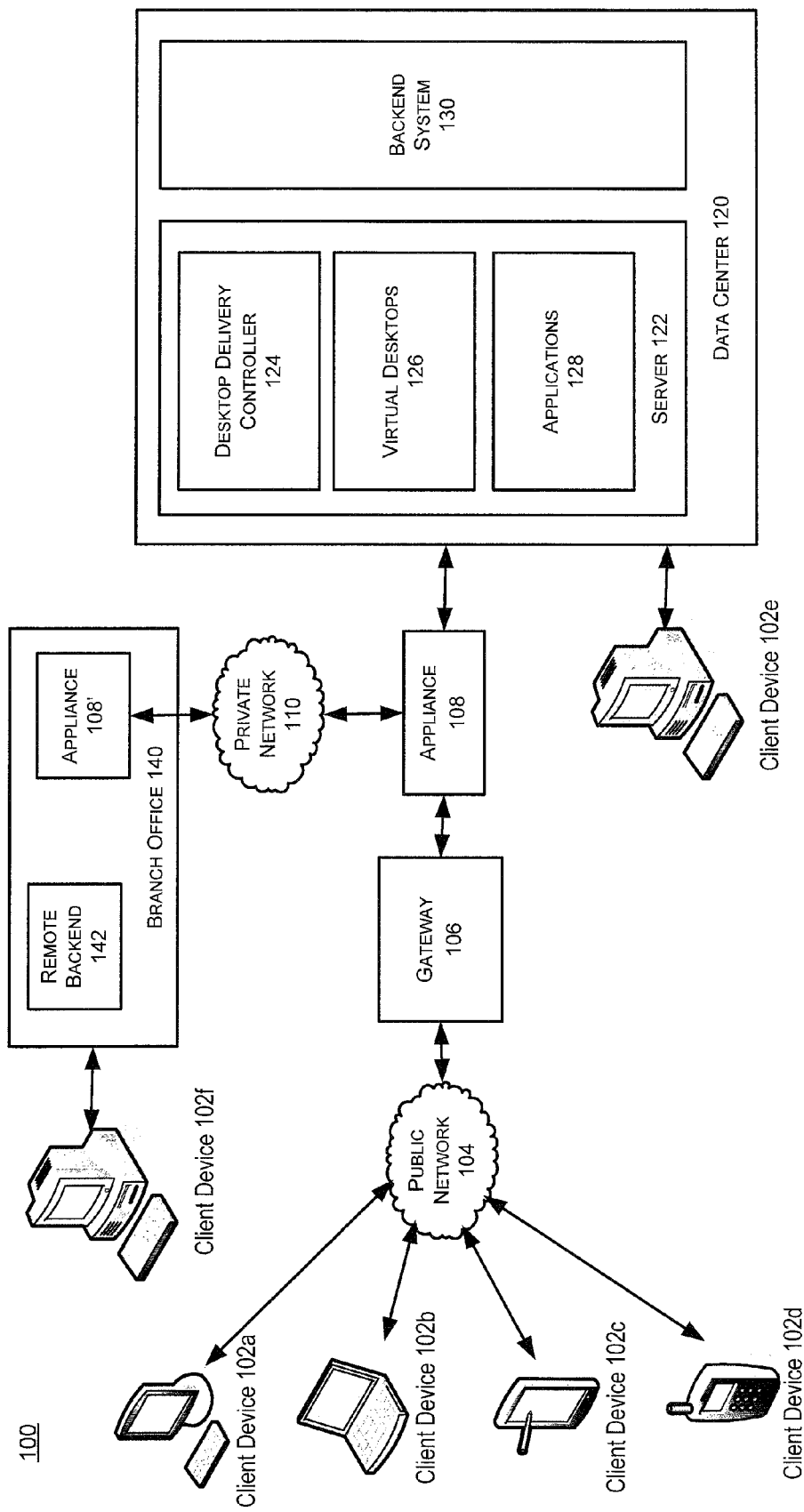
FIG. 1 is a block diagram of an exemplary network environment, consistent with embodiments of the present disclosure.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

As stated above, to ensure that packets are not discarded, some techniques for scheduling a number of packets, and a number of connections used to transmit packets on a given connection, can include creating a set of traffic classes that prioritize connections based on a set of metrics. These metrics can be determined by an administrator, or autonomously by a hosting device or a client device. For example, connections associated with users streaming multimedia data can be assigned a higher priority than connections associated with users who are sending emails because multimedia data is less tolerable to latency and jitter than email is. Prioritizing connections based on a set of metrics, as described in the previous example, is one way of providing each user with a certain Quality of Service (QoS).

Typically, a packet scheduler prioritizes packets, for transmission, by keeping track of different data types and the connections necessary in order to support these data types by creating a classification tree. A packet scheduler can organize the connections as leaves in a tree, with the first level of the tree representing a link between two physically distinct locations, and the internal nodes representing the classification of network packets. The packet scheduler then works by assigning priorities to each of the nodes and tries to keep a semi-sorted list of children on each node based on their priorities and the size of the packets being sent. This mechanism requires the packet scheduler to perform various semi-sorted operations, such as a sorting and/or heaping operations, on the packets classified in accordance with the internal nodes, resulting in a significant increase in processing time. The processing is most intense for internal nodes that have connections as children nodes. For example, a group of packets can be organized by application type (e.g., email) and represented by an internal node in the classification tree. This node can have several thousand children, each representing a connection used by a user or server sending and/or receiving email. As the number of connections grows, the amount of time spent performing the semi-sorted operations by the packet scheduler continues to increase, thus making it difficult for the packets associated with the internal nodes to be processed by the packet scheduler.

An algorithm that is commonly used, by routers and switches, to construct a classification tree is the Fair Queuing algorithm, or some variant of the algorithm. This algorithm attempts to provide each connection with a fair opportunity to transmit packets. However this approach, as mentioned above, begins to strain the resources of a packet scheduler as the number of connections increases. For example, if the Fair Queuing algorithm is used to queue and transmit packets for a thousand email connections, it will take the packet scheduler M log(1000) seconds for the node spawning the 1000 connections to recalculate the order in which each connection will transmit their next packet, after a packet has been transmitted on one of the connections. M can be determined by the number of instructions that can be executed by the packet scheduler on a central processing unit. Because the logarithm is a monotonically increasing function, the time needed to recalculate the order for each connection, after each packet has been sent, will increase monotonically as well.

An alternative approach has been created that reduces the amount of time, and computational resources necessary for a packet scheduler to manage a tree with thousands of connections.

FIG. 1 is a block diagram of an exemplary network environment 100. While exemplary network environment 100 is directed to a virtual network environment, it is appreciated that network environment 100 can be any type of network that communicates using packets. Network environment 100 can include one or more client devices 102, a public network 104, a gateway 106, an appliance 108, a private network 110, a data center 120, and a branch office 140.

One or more client devices 102 are devices that can acquire remote services from data center 120 through various means. Client devices 102 can communicate with data center 120 either directly (e.g., client device 102e) or indirectly through a public network 104 (e.g., client devices 102a-d) or a private network 110 (e.g., client device 102f). While client devices 102 are portrayed as a computer (e.g., client devices 102a, 102e, and 102f), a laptop (e.g., client device 102b), a tablet (e.g., client device 102c), and a mobile smart phone (e.g., client device 102d), it is appreciated that client device 102 could be any type of device that can send and receive signals to and from data center 120.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway 106 has the ability to modify signals received from client device 102 into signals that appliance 108 and/or data center 120 can understand and vice versa.

Appliance 108 is device that optimizes wide area network (WAN) traffic by including, for example, a quality of service (QoS) engine. In some embodiments, appliance 108 optimizes other types of network traffic, such as local area network (LAN) traffic or metropolitan area network (MAN) traffic. In an exemplary embodiment, appliances 108 and 108' optimize Wide Area Network (WAN) network traffic data. In some embodiments, appliance 108 can be a virtual appliance. In some embodiments, a first appliance (e.g., appliance 108) works in conjunction with or cooperation with a second appliance (e.g., appliance 108') to optimize network traffic. For example, the first appliance may be located between the WAN and a corporate local area network (LAN; e.g., data center 120), while the second appliance can be located between a remote backend system 142 within the branch office (e.g., branch office 140) and a WAN connection. In some embodiments, the functionality of gateway 106 and appliance 108 can be located in a single physical device. Appliance 108 is further described below.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122) and a backend system 130. In some embodiments data center 120 can include gateway 106, appliance 108, or a combination of both.

Server 122 is an entity that can be represented by any electronic addressable format, and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102a-f or branch office 140). For example, applications 128 can include Windows™-based applications and computing resources.

In some embodiments, the services include providing one or more virtual desktops 126 that can provide one or more applications 128. Virtual desktops 126 can include hosted shared desktops allowing multiple users to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 120. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network that is part of the WAN having data center 120. Branch office 140 can include, among other things, appliance 108' and remote backend 142. In some embodiments, appliance 108' can sit between branch office 140 and private network 110. As stated above, appliance 108' can work with appliance 108. Remote backend 142 can be set up in similar manner as backend system 130 of data center 120. Client device 102*f* can be located on-site to branch office 140 or can be located remotely from branch office 140.

Figure 2A:
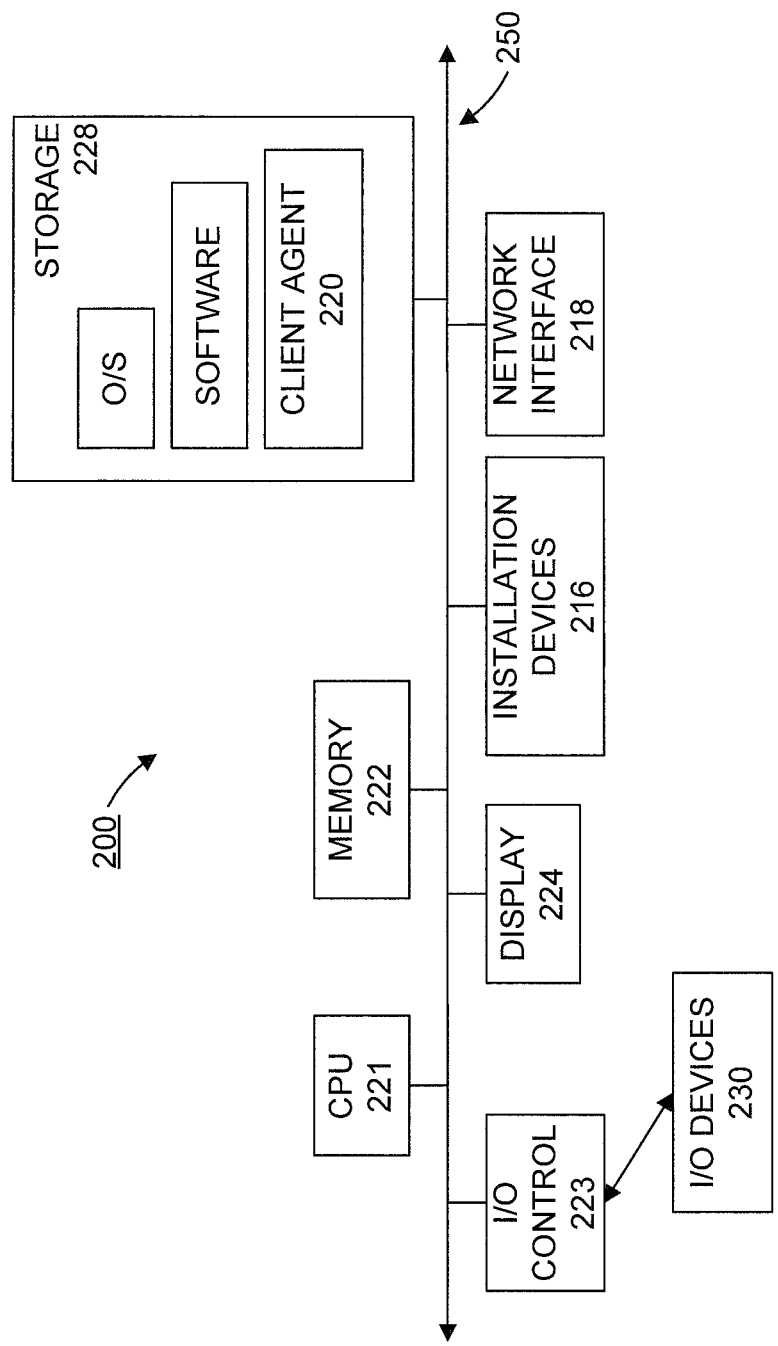
FIGS. 2A-2b are block diagrams of an exemplary computing device, consistent with embodiments of the present disclosure.
Figure 2B:
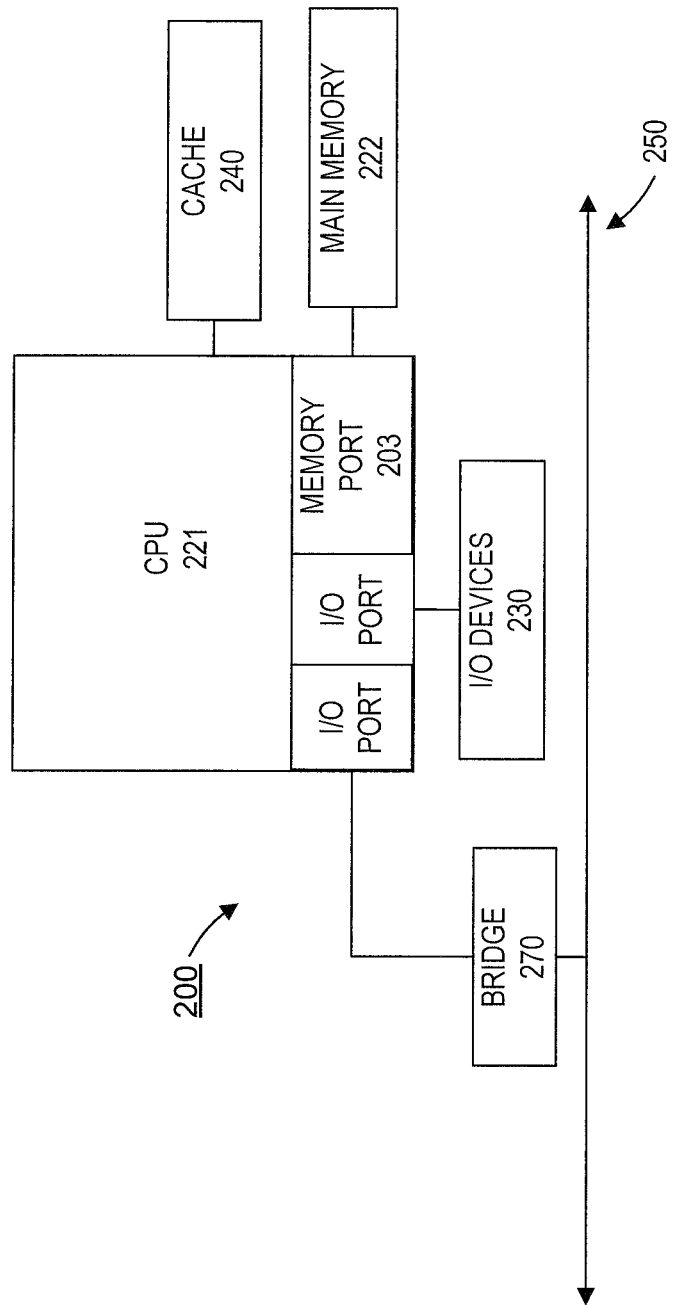

Appliances 108 and 108' and gateway 106 can be deployed as is, or executed on any type and form of computing device. Including any computer or networking device capable of communicating on any type and form of network described herein. As shown in FIGS. 2A-2B, each computing device 200 includes a central processing unit (CPU) 201 and a main memory 222. CPU 201 can be any logic circuitry that responds to and processes instructions fetched from the main memory 222. CPU 201 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible nontransitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. Main memory 222 can be one or more memory chips capable of storing data and allowing any storage location to be directly accessed by CPU 201. Main memory 222 can be any type of random access memory (RAM), or any other available memory chip capable of operating as described herein. In the exemplary embodiment shown in FIG. 2A, CPU 201 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. Furthermore, I/O device 230 can also provide storage and/or an installation medium for the computing device 200.

FIG. 2B depicts an embodiment of an exemplary computing device 200 in which CPU 201 communicates directly with main memory 222 via a memory port 203. CPU 201 can communicate with a cache 240 via a secondary bus, sometimes referred to as a backside bus. In some other embodiments, CPU 201 can communicate with cache 240 via system bus 250. Cache 240 typically has a faster response time than main memory 222. In some embodiments, CPU 201 can communicate directly with I/O device 230 via an I/O port. In further embodiments, I/O device 230 can be a bridge 270 between system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2A, computing device 200 can support any suitable installation device 116, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 CAN comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3:
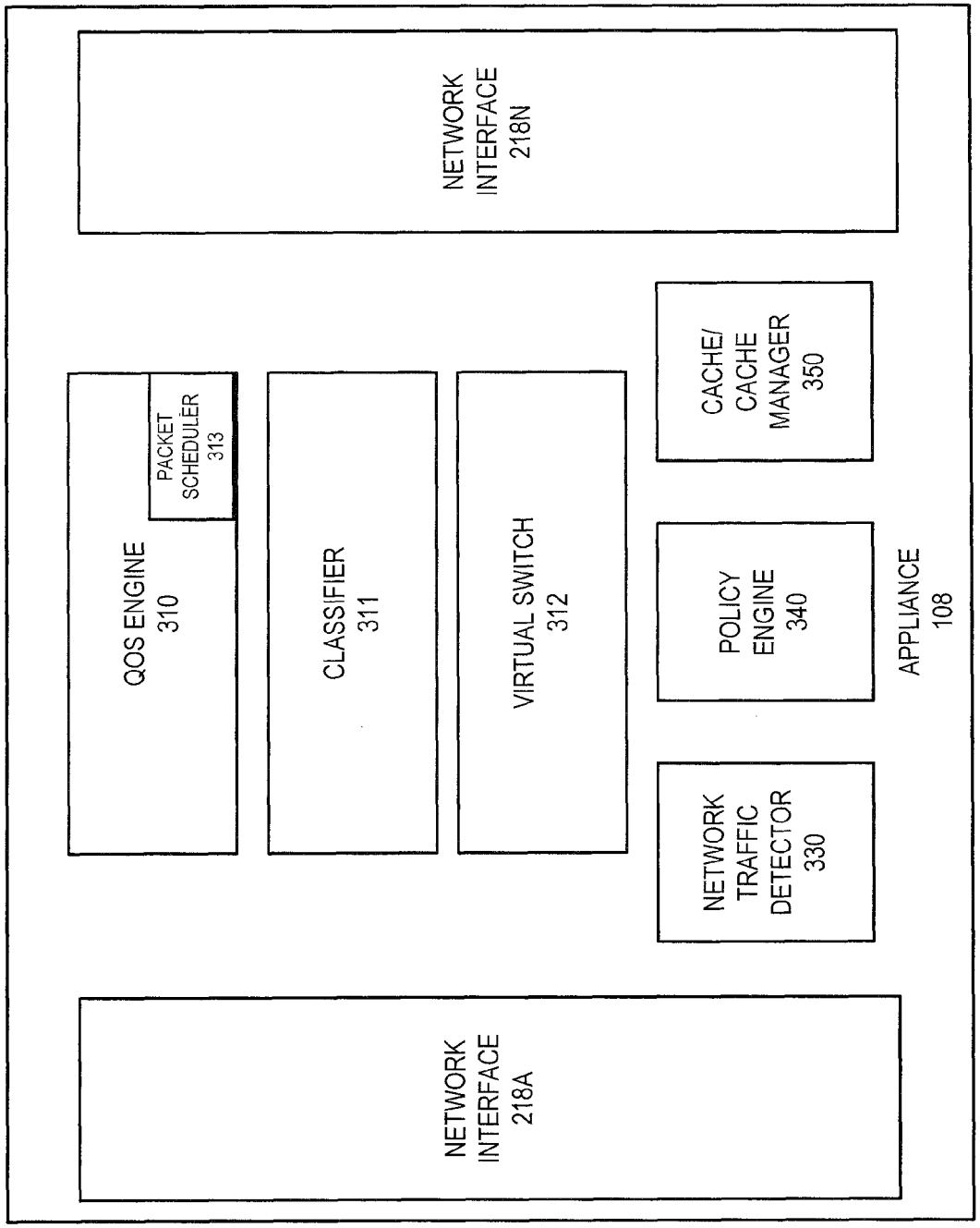
FIG. 3 is a block diagram of an exemplary computing device, consistent with embodiments of the present disclosure.

FIG. 3 is a block diagram of an exemplary appliance 108 of FIG. 1, consistent with embodiments of the present disclosure. Appliance 108 can include, among other things, one or more network interfaces 218A-N, a QoS engine 310, a classifier 311, a network traffic detector 330, a policy engine 340, and a cache with cache manager 350.

Network interface 218A-N intercepts user application packets, before they are sent through a network, and sends them to classifier 311 via network traffic detector 330. Network Interface 218A can send packets to network traffic detector 330, or cache 350 if the queue in network traffic detector 330 becomes full. Network Traffic Detector 330 can detect network traffic packets of differing types, including but not limited to LAN packets, WAN packets, Wireless Local Area Network (WLAN) packets, private area network packets, etc. classifier 311 can be used to classify network packets according to the network that the packets originate from, the network that the packets are destined for, the applications that generated the packets, or the applications that the packets are destined for. Classifier 311 can be configured autonomously or by a network administrator. Although only one classifier is presented in FIG. 3, multiple instances of classifier 311 can be implemented in a single appliance 108.

Policy Engine 340 can create policies, which can be used by QoS Engine 310. The policies can be used to prioritize outgoing packets based on the classification scheme implemented by classifier 311. QoS Engine 310 can prioritize outgoing network packets by enforcing the policies created by policy engine 340 before the outgoing network packets are sent to the outgoing interface of network interface 218A. Packet scheduler 313 is included in QoS engine 310.

Figure 4A:
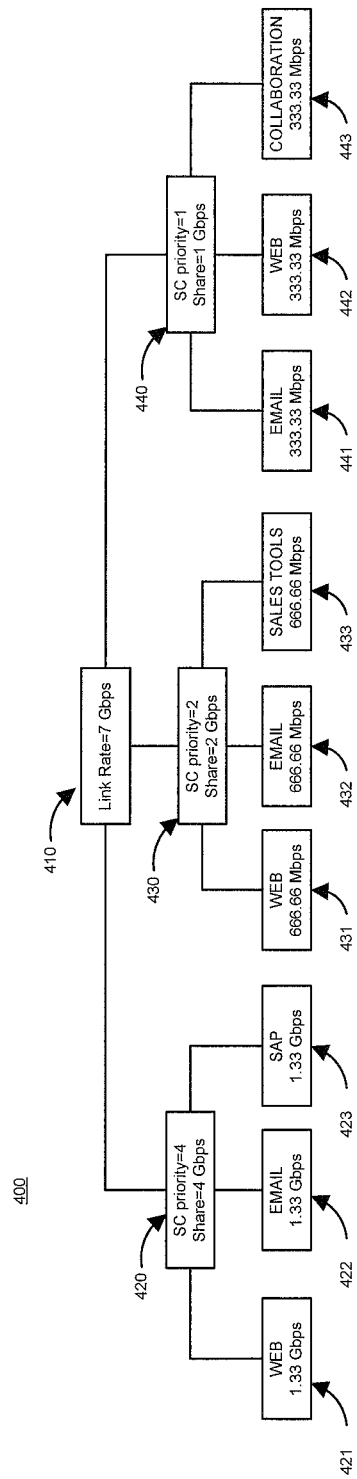
FIG. 4A-4B are block diagrams of an exemplary classification tree, consistent with the embodiments of the present disclosure.

FIG. 4A is an exemplary hierarchical network traffic classification tree 400, consistent with the embodiments presented in this disclosure. Classification tree 400 can assist with organizing network traffic according to a classification scheme specified by an administrator, classifier 311, other components of appliance 108, appliance 108, or another appliance 108'. For example, the classification scheme can include one or more semi-sorted operations, such as sorting and/or heaping operations. The classification scheme can use a heaping operation to construct the tree. Several heaping algorithms can be used to construct the tree including: create-heap, heapify, find-max or find-min, delete-max or delete-min, increase-key or decrease-key, insert, merge, Fair Queuing (FQ), Weighted Fair Queuing (WFQ), Hierarchical Packet Fair Queuing (H-PFQ), Hierarchical Worst-case Fair Weighted Fair Queuing (H-WF$^2$Q), Hierarchical Worst-case Fair Weighted Fair Queuing Plus (H-WF$^2$Q+), and variations thereof. The implementation of the semi-sorted operation can be a data structure constructed in any language, some of which include C++, Boost C++, Java, Python, PHP, Perl, Apple Core Foundation library, Go library, etc. It is appreciated that the semi-sorted operation can be implemented in firmware source code, hardware source code, or a combination of software source code, firmware source code, and/or hardware source code.

Classification tree 400 can be constructed by classifier 311. Classifier 311, can receive and analyze network traffic from network traffic detector 330, and construct or revise a classification tree 400. In some embodiments, network traffic detector 330 analyzes the traffic and provides information to classifier 311. It is appreciated that classifier 311 and other classifiers can access the classification tree 400 from a central location, in memory 222, storage 228, and/or memory/storage associated with one or more network interfaces 218A-N. In some other embodiments, classifier 311 and other classifiers can maintain separate copies of classification tree 400, in separate memories, storage devices, and/or memory/storage devices associated with one or more network interfaces.

Packet scheduler 313 also maintains a copy of classification tree 400, as explained above, and schedules packet transmissions in accordance with the classification of packets in classification tree 400. Classification tree 400 can be implemented, in part, by using the heaping operation H-WF$^2$Q+ or some other semi-sorted operation. It is appreciated that classification tree 400 can be stored in a central location, in memory 222, storage 228, and/or memory/storage associated with one or more network interfaces 218A-N, allowing packet scheduler 313 and one or more classifiers to access it. It is also appreciated that packet scheduler 313 and the one or more classifiers have separate copies of classification tree 400, in separate memories, storage devices, and/or memory/storage devices associated with one or more network interfaces.

Classification tree 400 can include a link node 410, one or more service-class nodes 420, 430 and 440, and one or more service-class connection nodes (e.g., service-class connection nodes 421, 422 and 423). In some embodiments, one or more sub-service-class nodes (not shown) can exist between a service-class node (e.g., service-class node 430) and service-class connection nodes (e.g., service-class connection nodes 433). Therefore, classification tree 400 can have more than 3 levels of hierarchy as shown in FIG. 4A.

Packet scheduler 313 also categorizes the nodes in classification tree 400, with a link node 410, one or more service-class nodes 420, 430, and 440, one or more sub-service-class nodes (not shown), and one or more service-class connection nodes (e.g., service-class connection nodes 421 and 423). Link node 410 can be implemented using one or more source code modules alone or in combination with one or more data structures (referencing its children service-class nodes), all of which can be stored in memory 222, storage 228, and/or memory/storage associated with one or more network interfaces 218A-N.

Each internal node (i.e., service-class, sub-service-class, and service-class connection nodes) can represent a logical queue. For those internal nodes that provide a semi-sorted operation, each logical queue can be implemented using, for example, a Worst-case Fair Weighted Fair plus (WF$^2$Q+) queuing algorithm. For example, as shown in FIG. 4A, service-class nodes 420, 430, and 440 can represent a semi-sorted logical queue. Packet scheduler 313 uses these semi-sorted logical queues as building blocks to organize how packets will be scheduled for transmission, based on the service classes and priority of these service classes in classification tree 400. The organization of link node 410 and service class nodes 420, 430, and 440 can be implemented using a semi-sorted operation, such as the WF$^2$Q+ queuing algorithm into a hierarchical structure like the upper nodes of classification tree 400 can be implemented using the H-WF$^2$Q+ algorithm.

Packet scheduler 313 can prioritize the transmission of packets using the algorithm mentioned above by storing pending packets in one or more shared memory pools encompassing all of memory 222 or some portion thereof. Several single read single write queues can be created using memory 222. The logical queues can be no-lock queues used to carry the headers of QoS packets, which can include link, classification, connection identification and packet size information as well packet pointer information.

Classification tree 400, consists of link node 410 which can represent a physical link between different physical devices (e.g. New York to Bangalore), or a virtual circuit between different virtual or physical devices. Each of the service classes 420, 430, and 440 can represent different traffic classes classified by classifier 311. In some embodiments, service classes represented by service class nodes 420, 430, and 440 can be organized according to the data rates associated with different departments in an organization, supported by the link represented by link node 410. For example, if the link represented by link node 410 from New York to Bangalore has a bandwidth of 7 Gigabits per second (Gbps), data rates can be assigned to each department (e.g., Engineering department represented by service class node 440 receives 1 Gbps, Sales department represented by service class node 430 receives 2 Gbps, and Managers represented by service class node 420 receives 4 Gbps). In some embodiments, the data rates can be provided based on priority levels. For example, a priority level of "1," "2," and "4" could indicate that the service-class nodes could correspond to data rates of 1 Gbps, 2 Gbps, and 4 Gbps, respectively, of a link having 7 Gbps. Data rates can be assigned by a network administrator, classifier 311, other components in appliance 108, appliance 108, or another appliance 108'.

Packet scheduler 313 can partition the bandwidth associated with a link amongst the logical queues that contain packets. Empty logical queues are not allocated bandwidth. For example, if the link represented by link node 410 from New York to Bangalore has a bandwidth of 7 Gigabits per second (Gbps), bandwidth can be assigned to a queue associated with each department (e.g., Engineering 440 receives 1 Gbps, Sales 430 receives 2 Gbps, and Managers 420 receives 4 Gbps). If, however, one department (e.g., Engineering 440) no longer has any packets to send, the bandwidth allocated to the queue servicing Engineering 440 can be reallocated to Sales 430 and Managers 420. Or the bandwidth cannot be reassigned to either department. The decision to reallocate the unused bandwidth to another queue, can be determined by an administrator, classifier 311, other components of appliance 108, appliance 108, or another appliance 108'.

In some embodiments, classifier 311 can create service classes, using different link metrics including: latency or jitter experienced by a packet as it traverses a link, number of link segments a packet is expected to traverse, average number of link segments a packet traverses, expected end-to-end delay, average end-to-end delay, throughput, department security requirements, or any user defined metrics describing the quality or characteristics of the link. For example, each service class can represent the security requirements associated with a department in the organization. A service class associated with a department, subject to a higher risk of network attacks, can have a higher level of protection assigned to it. A service class associated with a department with a lower risk of being attacked, can have a reduced level of protection assigned to it.

Packet scheduler 313 can also implement the $WF^2Q+$ algorithm for each logical queue according to different metrics including latency, jitter, number of link segments a packet is expected to traverse, average number of link segments a packet traverses, expected end-to-end delay, average end-to-end delay, throughput, department security requirements, or any user defined metric describing the quality or characteristics of the link.

The children of each service class 420, 430, and 440 can represent the traffic according to application type. For example, Engineering 440 can classify traffic into three children nodes representing email, web, and collaboration, whereas Managers 420 classifies traffic by email, web, and SAP. The children nodes can also be classified according to different link metrics as explained above for each parent node. In some embodiments, the service-class connection nodes share evenly the data rate of the service-class node that they are connected to. For example, if manager service-class node 420 has a data rate of 4 Gbps, service-class connection nodes 421, 422, and 423, would each have a data rate of 1.33 Gbps. In some embodiments, service-class connection nodes can have different data rates.

Packet scheduler 313 can also organize each logical queue according to application type. For example, there can be multiple children connections of each service class node, each of which represents a logical connection on link 410 between two appliances 108 and 108' or any connection between any two devices on WAN. As explained above however, the time and processing requirements of packet scheduler 313 begin to increase without bound as the number of connections associated with a service class increases.

In some embodiments, classifier 311 can create service classes that represent different link metrics. Thereby allowing an administrator, classifier 311, other components of appliance 108, appliance 108, or another appliance 108' to construct a classification tree 400, with service classes that represent link metrics, instead of department and application types as shown in FIG. 4A. For example, service classes 420-440 can represent latency, jitter, and average number of link segments a packet traverses respectively.

The children nodes of latency node 420 and jitter node 430 can represent a latency and jitter threshold respectively for different link layer protocols on a given link. For example, children nodes of 420 and 440, can represent a tolerable amount of latency and jitter beyond which appliance 108 can begin to drop packets associated with Automatic Resolution Protocol (ARP), Neighbor Discovery Protocol (NDP), Open Shortest Path First (OSPF) protocol, Tunneling protocol, Point-to-Point protocol, Discovery and Configuration Protocol, or any other link layer protocol.

Although FIG. 4A only depicts three service classes, each of which spawns three children service-class connection nodes, it should be noted that one skilled in the art can construct a classification tree 400 composed of different classes representing any number of combinations and permutations of different devices, applications running on a device, protocols used to communicate between devices, components within a device, or any combination of the aforementioned to classify components consistent with the embodiments of the present disclosure.

Figure 4B:
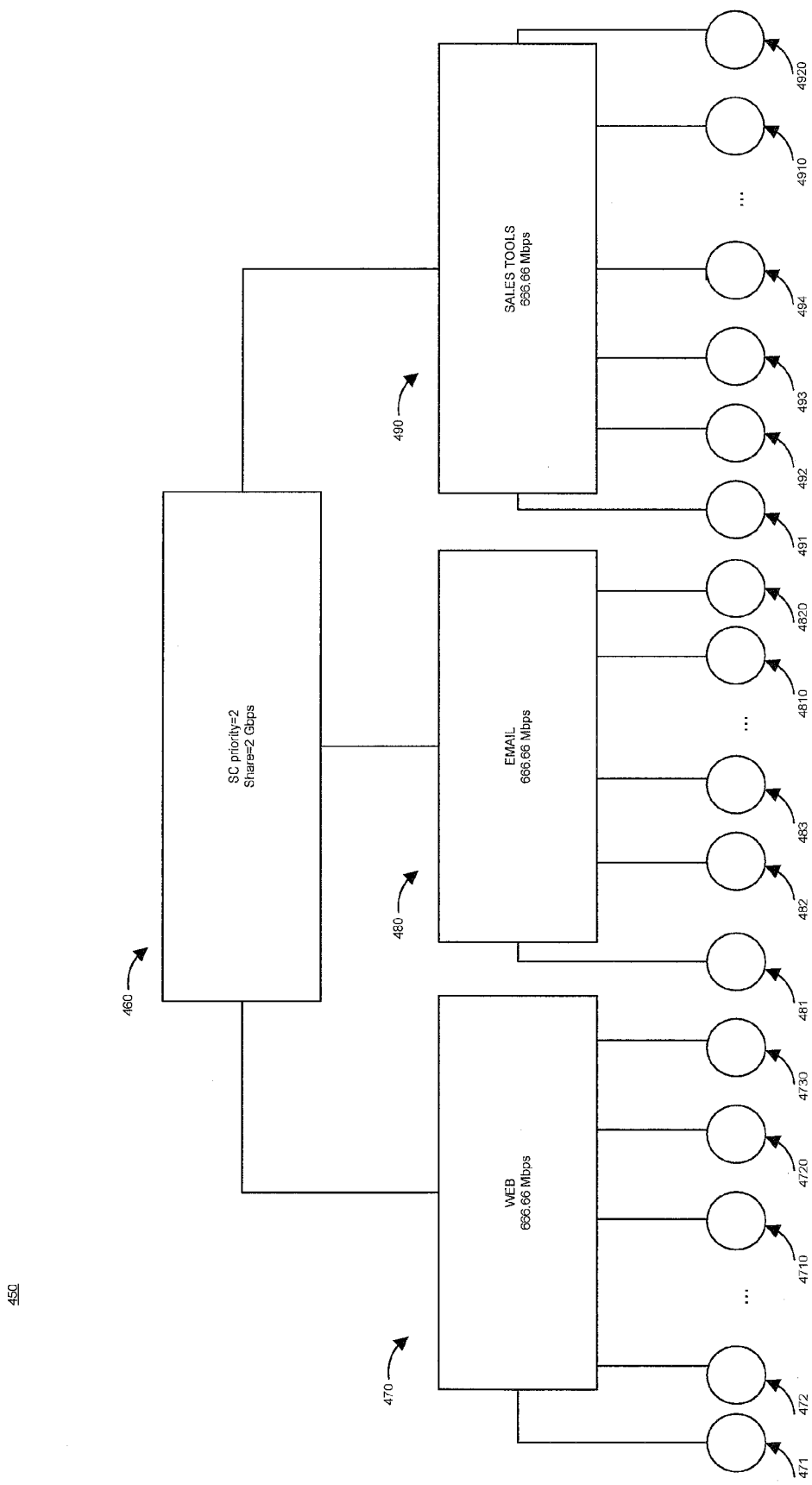

FIG. 4B is an exemplary hierarchical network traffic classification tree 450, consistent with the embodiments presented in this disclosure. It is appreciated that classification tree 450 can be a portion of classification tree 400. Classification tree 450 provides an exemplary embodiment as to how a classification tree can implement a service-class node (or a sub-service class node) having one or more connections. For example, a service class associated with email traffic (e.g., service class 480) can have several connection nodes 481-4820, a service class associated with web traffic (e.g., service class 470) can have several connection nodes 471-4730, and a service class associated with sales tools traffic (e.g., service class 490) can have several connection nodes 491-4920. As explained above, while a service-class node (or a sub-service class node) can be implemented using the semi-sorted operation $H-WF^2Q+$, this approach can result in a strain on the resources of the packet scheduler. Instead, a credit-based round-robin approach (e.g., deficit round-robin approach) can be used by the parent node of the connections (i.e., the service-class node or the sub-service-class node) to service the packets being sent on each connection to reduce the computational complexity of servicing packets across those connections.

Such an approach reduces the overall computational complexity from O(log N), where N represents the number of connections, to O(1). Since the round robin approach does not increase in computational complexity as N grows, we can see the advantage as the number of connections increase. With 10,000 connections, the WFQ approach is 400% more intensive per packet than the round robin approach.

Therefore, a credit-based round robin approach to organizing connections for a service class can reorganize connections at a faster speed than a semi-sorted approach, regardless of the number of connections.

Furthermore, a classification tree consisting of service-class nodes, representing logical queues implemented by the semi-sorted approach, and service-class nodes and/or sub-service-class nodes representing logical queues with connections implemented using the credit-based round robin algorithm can service packets at a faster rate. If the service-class nodes are the direct parents of the connections, the service class nodes representing logical queues with connections can be implemented using the credit-based round-robin approach. The direct parent maintains a credit-based round-robin queue, which includes a list of connections that corresponds to the connections of the direct parent. Moreover, each connection in the list can have their own connection queue holding that connection's data packets waiting to be scheduled.

A packet scheduler can provide a more fair transmission of packets using a combined semi-sorted credit-based round robin algorithm. The packet scheduler can schedule the transmission of packets based on the amount of time it will take to send the inbound traffic to its intended destination. The packet scheduler can accomplish this by scheduling the transmissions based on the amount of time it will take for each packet to be successfully transmitted. For example, a particular department within an organization can generate multimedia data (e.g., VoIP calls, video conferencing, live audio and video) exclusively, and another department can generate non-multimedia data (e.g., email, instant messaging applications, web) exclusively. Because multimedia data packets typically include more data than non-multimedia data packets, the amount of time necessary to send and receive multimedia data packets can be greater than the amount of time necessary to send and receive non-multimedia data packets. As a result, the bandwidth for the department generating multimedia data packets can be greater. A packet scheduler can then assign a priority (e.g., higher priority) to the department (e.g., service class 430 with a priority of 2) generating multimedia data packets and assign another priority (e.g., lower priority) to the department (e.g., service class 440 with a priority of 1) generating non-multimedia data packets.

After the packet scheduler has sorted the traffic according to the time it will take each department to transmit their packets, the packet scheduler can further schedule packet transmissions based on the amount of time it will take to transmit the different types of traffic within each department using the same semi-sorted approach. For example, a packet scheduler can further sort network traffic generated by the department producing/requesting multimedia data, and the department producing/requesting non-multimedia data into sub-service classes. For instance, video data can take longer to process than VoIP data, therefore a larger portion of the bandwidth allocated to the department producing/requesting multimedia data can be used for video data. The process can continue to further subdivide the incoming network traffic by semi-sorting the traffic in each service class/sub-service class. The process comes to an end when a packet scheduler schedules a packet for transmission on a given connection. The packet scheduler then uses a credit-based round robin approach to schedule packet transmissions on a given connection, as described below.

It should be noted that the direct parent maintains a credit-based round-robin queue, which includes a list of connections corresponding to the connections of the direct parent. Moreover, each connection in the list can have their own connection queue holding that connection's data packets waiting to be scheduled.

Figure 5:
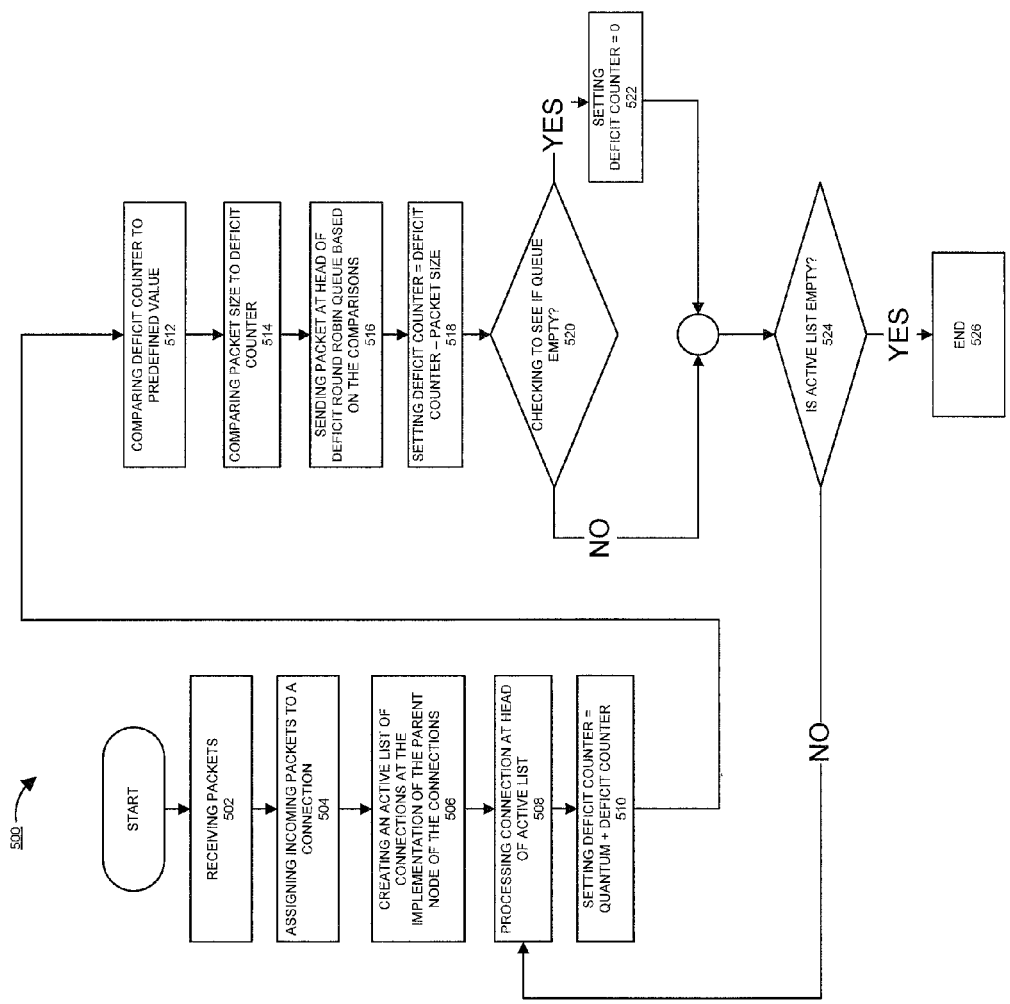

FIGS. 5-7 are flowcharts representing an exemplary method of scheduling network connections for transmission of prioritized network packets, consistent with embodiments of the present disclosure. It will be readily appreciated by one of ordinary skill in the art that the illustrated procedure can be altered to delete steps or further include additional steps. After initial start step, a packet scheduler (e.g., packet scheduler 313), can receive network packets (502).

A packet scheduler can assign each packet to a service-class connection (504). Packet assignment can be based on the data rate assigned to a service class (e.g., service class 480) and the data rates required by an application running on a client device (e.g., one of client devices 102a-f). For example, the service class with packets requiring a data rate of no more than 666.66 Mbps can be evenly shared amongst service-class connection nodes (e.g., service-class connection nodes 481-4820). In some embodiments, the data rates required by packets in a given service class can be different. For example, the service class can have packets requiring a data rate of 5 Mbps, 3 Mbps, and 2 Mbps. Service-class connection nodes can be assigned data rates to support the data rates required by the packets. For instance, a data rate of 5 Mbps can be assigned to a first service-class connection node, a data rate of 3 Mbps can be assigned to a second service-class connection node, and a data rate of 2 Mbps can be assigned to a third service-class connection node. Although only 10 Mbits of the total 666.66 Megabits are used to transmit the packets, the additional bandwidth can be used to increase the throughput on a connection. The additional bandwidth can be assigned to a connection, based on other factors including but not limited to, number of packets dropped on a connection, number of corrupted packets on a connection, latency and jitter experienced by packets on a connection, number of packets that arrive out of order on a given connection, or any other metrics determined by an administrator, packet scheduler, components of an appliance, an appliance, another appliance, or any other network device authorized to assign bandwidth to a connection.

After packets have been assigned to a service-class connection, an active list of service-class connections can be created (506). The active list of service-class connections includes the connections of the parent node (i.e., service class). For example, a classifier (e.g., classifier 311) can receive sales tools packets, collaboration packets, and SAP packets from client devices (e.g., 102b and 102d). A packet scheduler (e.g., packet scheduler 313) can create a list of connections, corresponding to each packet type, that will transport the packets to their destination.

After a list has been created, the packet scheduler can process a connection at the top of the active list for service in step 508. The method then progresses to step 510, where the deficit counter is set to a determined constant, quantum, plus the value of the deficit counter. The deficit counter is a numeric value used to determine whether a packet queued on the processed connection will be transmitted. For example, a deficit counter can be increased to a certain numeric value, and the value can be compared to the size of a packet at the head of a queue of the processed connection. If the deficit-counter value exceeds the packet size, the packet can be transmitted. If the deficit-counter value is less than the packet size, the packet will not be transmitted. The deficit-counter value can be increased until the deficit-counter value exceeds the size of the packet, as explained in step 514.

The constant, quantum, is a number that is used to increase the deficit counter for each connection with packets that are greater in size than the deficit counter. That is, the quantum value can vary across different connections. This mathematical relationship is used so that each connection is allowed a fair opportunity to transmit packets, regardless of the size of the packets. For example, if two connections each contain a single packet of different sizes in their queues, the connection with a queue containing the larger packet can have a deficit counter that is greater in value than the deficit counter associated with the other connection. This is done to ensure that connections with larger packets are not given a greater priority than connections with smaller packets. Quantum can be determined by an administrator, a classification engine, other components of an appliance, an appliance, or another device connected to an appliance via Wide Area Network (WAN).

After a deficit counter has been set, the packet scheduler compares the deficit counter to a predefined value at step 512. An embodiment of a subroutine by which the packet scheduler compares the deficit counter to a predefined value is further described in FIG. 6.

As shown in FIG. 6, the packet scheduler determines (602) whether a queue of the processed connection currently being serviced for packets is empty and the deficit counter is less than a predefined value (e.g., zero). While in this embodiment the predefined value is equal to zero, it is appreciated that predefined value can be any real number and can change with each comparison in step 512. Increasing the predefined value can increase the number of times the method enters into the subroutine of FIG. 6. For example, if a predefined value is equal to 100, a deficit counter is equal to zero, and a quantum value is equal to 10, any connection with a deficit counter less than 100 will enter subroutine of 512 eleven times, before the deficit counter accumulates enough value to exceed the predefined value. Equivalently, decreasing the predefined value can decrease the number of times the method enters into the subroutine of FIG. 6. An administrator, a classification engine, other components of an appliance, an appliance, or another device connected to the appliance via WAN can change the predetermined value for a subset of connections to allow the connections more time to transmit packets. For example, if a subset of packets (e.g. Emergency Notification System messages) must be sent to client devices on WAN within a certain time period, connections that service these packets can be assigned a lower predetermined value than other connections in an active list.

If the deficit counter is greater than or equal to the predefined value and the queue is not empty, the processed connection is added to the end of the active list in step 604. Afterwards, the method can proceed back to FIG. 5 at step 524, which is further described below. Moreover, in some embodiments, because the packet scheduler added the processed connection to the end of the active list in step 604 and the active list will not be empty, it is appreciated that the method can proceed to step 508 of FIG. 5.

If the processed connection queue is empty, the deficit counter is set to zero at step 606. It should be noted that the relationship between the deficit counter and the predefined value does not need to be considered because there are no packets in the queue for the deficit counter to be compared against. Afterwards, the method can proceed back to FIG. 5 at step 524, which is further described below.

If a deficit counter is greater than a predefined value and the queue is not empty, the method progresses to step 514 of FIG. 5, which involves the packet scheduler comparing the size of the packet at the head of the processed connection queue with the deficit counter.

An embodiment by which the packet scheduler compares the packet size with the deficit counter is further described in FIG. 7. As shown in FIG. 7, the packet size is compared to a deficit counter. If the packet size is greater than the deficit counter, the packet scheduler adds the processed connection to the end of the active list, and the method progresses to step 524 of FIG. 5.

If, however, the packet size is less than or equal to the deficit counter, the method progresses to step 516 of FIG. 5, in which the packet scheduler sends the packet, at the head of the connection queue, to a network interface for transmission to WAN. It should be noted that the credit-based round robin queue includes a list of connections that correspond to the connections of the direct parent of the connections. Moreover each of those connections can have their own connection queue containing the data packets waiting to be scheduled.

The packet scheduler can set the deficit counter, in step 518, to the previous value of the deficit counter minus the size of the packet sent in step 516. In other embodiments, the mathematical relationship between the deficit counter and the size of the packet can be different.

Afterwards, the packet scheduler determines whether the processed connection queue is empty (520). If it is not empty, the method proceeds to step 524. If, however, the queue is empty, the packet scheduler sets the deficit counter to zero in step 522. Moreover, while not displayed, it is appreciated that the processed connection can be removed from the active list, and the method progresses to step 524.

At step 524, the packet scheduler can determine whether there are any connections remaining in the active list. If there are connections remaining in the active list, the method can progress to step 508. If, however, there are no connections remaining in the active list, the method can end (526).

While FIGS. 5-7 focus on a single active list of connections, it is appreciated that more than one active list can be maintained by the packet scheduler. In some embodiments, the packet scheduler can maintain multiple classification trees, each of which maintains an active list of connections. For example, the packet scheduler can maintain different classification trees for different metrics. For instance, a classification tree can be created with service classes representing the average latency experienced by a packet on a connection, and a classification tree can be created with service classes representing the average inter-arrival time of packets on a connection. An active list of connections can be maintained for both trees. In other embodiments, packet schedulers can maintain multiple active lists for a single tree. For example, a packet scheduler can create an active list of connections for a classification tree with multiple links to the same destination each of which has a link rate different than the other link rates, given that the service classes, sub-service classes, and service-class connections are the same.

The methods disclosed herein can be implemented as a computer program product comprising computer-readable instructions. Computer-readable instructions can be stored on a tangible non-transitory computer-readable medium, such as a flexible disk, a hard disk, a CD-ROM (compact disk-read only memory), an MO (magneto-optical) disk, DVD-ROM (digital versatile disk-read only memory), a DVD RAM (digital versatile disk-random access memory), or a semiconductor memory. Alternatively, the methods can be implemented in hardware components or combinations of hardware and software of a data processing apparatus, e.g. a programmable processor, a computer, or multiple computers. The computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An appliance having a memory and one or more processors, the appliance comprising:
a packet scheduler configured to:
assign received data packets or representation of data packets to one or more connection nodes of a classification tree having a link node and first and second intermediary nodes associated with the link node via one or more semi-sorted queues, wherein the one or more connection nodes correspond with the first intermediary node;
process the one or more connection nodes using a credit-based round robin queue; and
authorize the sending of the received data packets based on the processing.

2. The appliance of claim 1, wherein the first intermediary node is a service class node.

3. The appliance of claim 1, wherein the first intermediary node is a sub-service class node and the second intermediary node is a service class node, wherein the link node includes a semi-sorted queue identifying the second intermediary node and the second intermediary node includes a semi-sorted queue identifying the first intermediary node.

4. The appliance of claim 1, wherein the credit-based round robin queue is a deficit round robin queue.

5. The appliance of claim 1, wherein the credit-based round robin queue is comprised of an active list of one or more connections of the first intermediary node.

6. The appliance of claim 5, wherein the packet scheduler is further configured to process a first connection of the one or more connections at the head of the active list.

7. The appliance of claim 6, wherein the packet scheduler is further configured to:
determine whether a connection queue associated with the first connection is empty; and
compare a deficit counter with a predefined value.

8. The appliance of claim 7, wherein the packet scheduler is further configured to:
if the connection queue is not empty and the deficit counter is greater than the predefined values, compare a size of a data packet referred to in the connection queue associated with the first connection with the deficit counter; and
send the data packet if the size of the data packet is less than or equal to the deficit counter.

9. The appliance of claim 8, wherein the packet scheduler is further configured to process a next connection identified in the active list.

10. A method for scheduling a packet transmission, the method performed by an appliance having one or more processors and comprising:
assigning received data packets or representation of data packets to one or more connection nodes of a classification tree having a link node and first and second intermediary nodes associated with the link node via one or more semi-sorted queues, wherein the one or more connection nodes correspond with the first intermediary node;
processing the one or more connection nodes using a credit-based round robin queue; and
authorizing the sending of the received data packets based on the processing.

11. The method of claim 10, wherein the first intermediary node is a service class node.

12. The method of claim 10, wherein the first intermediary node is a sub-service class node and the second intermediary node is a service class node, wherein the link node includes a semi-sorted queue identifying the second intermediary node and the second intermediary node includes a semi-sorted queue identifying the first intermediary node.

13. The method of claim 10, wherein the credit-based round robin queue is a deficit round robin queue.

14. The method of claim 10, wherein the credit-based round robin queue is comprised of an active list of one or more connections of the first intermediary node.

15. The method of claim 14, wherein the packet scheduler is further configured to process a first connection of the one or more connections at the head of the active list.

16. The method of claim 15, further comprising:
determining whether a connection queue associated with the first connection is empty; and
comparing a deficit counter with a predefined value.

17. The method of claim 16, further comprising:
if the connection queue is not empty and the deficit counter is greater than the predefined values, comparing a size of a data packet referred to in the connection queue associated with the first connection with the deficit counter; and
sending the data packet if the size of the data packet is less than or equal to the deficit counter.

18. The method of claim 17, further comprising processing a next connection identified in the active list.

19. A non-transitory computer readable storage medium storing a set of instructions that are executable by at least one processor of an appliance to cause the appliance to perform a method of scheduling a packet transmission, the method comprising:
assigning received data packets or representation of data packets to one or more connection nodes of a classification tree having a link node and first and second intermediary nodes associated with the link node via one or more semi-sorted queues, wherein the one or more connection nodes correspond with the first intermediary node;
processing the one or more connection nodes using a credit-based round robin queue; and
authorizing the sending of the received data packets based on the processing.

20. The computer readable storage medium method of claim 19, wherein the first intermediary node is a service class node.

21. The computer readable storage medium method of claim 19, wherein the first intermediary node is a sub-service class node and the second intermediary node is a service class node, wherein the link node includes a semi-sorted queue identifying the second intermediary node and the second intermediary node includes a semi-sorted queue identifying the first intermediary node.

22. The computer readable storage medium method of claim 19, wherein the credit-based round robin queue is a deficit round robin queue.

23. The computer readable storage medium method of claim 19, wherein the credit-based round robin queue is comprised of an active list of one or more connections of the first intermediary node.

24. The computer readable storage medium method of claim 23, wherein the packet scheduler is further configured to process a first connection of the one or more connections at the head of the active list.

25. The computer readable storage medium method of claim 24, further comprising instructions executable by at least one or more processors of the appliance to cause the appliance to perform:
determining whether a connection queue associated with the first connection is empty; and
comparing a deficit counter with a predefined value.

26. The computer readable storage medium method of claim 25, further comprising instructions executable by at least one or more processors of the appliance to cause the appliance to perform:
if the connection queue is not empty and the deficit counter is greater than the predefined values, comparing a size of a data packet referred to in the connection queue associated with the first connection with the deficit counter; and sending the data packet if the size of the data packet is less than or equal to the deficit counter.

27. The computer readable storage medium method of claim 26, further comprising instructions executable by at least one or more processors of the appliance to cause the appliance to perform:

processing a next connection identified in the active list.

28. One or more non-transitory computer readable mediums including a classification tree, comprising:

a link node representing a link that provides data packets;

a first intermediary node associated with the link node via one or more semi-sorted queues;

a second intermediary node associated with the link node via the one or more semi-sorted queues; and a first set of connection nodes associated with the first intermediary node via a credit-based round robin queue, wherein the data packets or representations of the data packets are assigned to one or more connections of the first set of connection nodes and are scheduled using the credit-based round robin queue.

29. An appliance for scheduling data packets, the appliance having a memory and one or more processors and comprising:

a packet scheduler configured to assign data packets or representation of data packets to one or more connection nodes of a first set of connection nodes and schedule data packets according to a classification tree including a link node representing a link, a first intermediary node associated with the link node, a second intermediary node associated with the link node, and the first set of connection nodes associated with the first intermediary node, wherein the packet scheduler includes one or more semi-sorted queues associating the link node with the first intermediary node and the second intermediary node, wherein the first intermediary node selects data packets assigned to the one or more connection nodes for using a credit-based round robin.

* * * * *